Sept. 11, 1962 L. W. BROOKS 3,053,502
SEALING WASHER FOR FAUCETS AND OTHER VALVES
Filed May 2, 1960
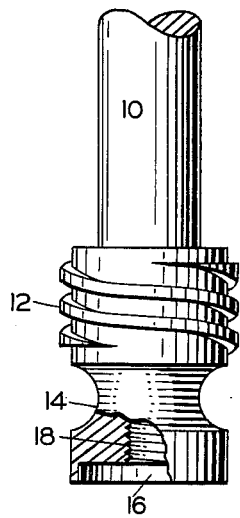
Fig. 1
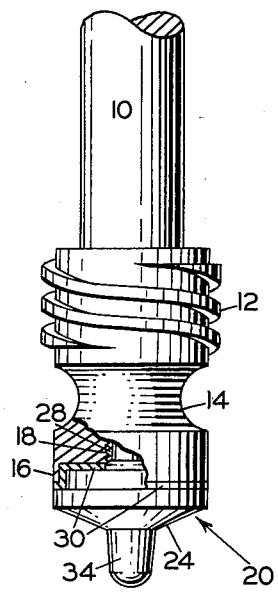
Fig. 5
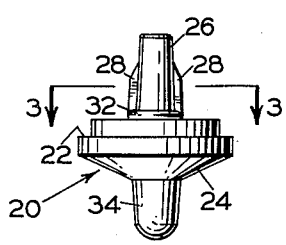
Fig. 2
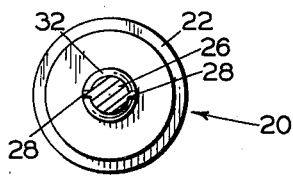
Fig. 3
Fig. 4
INVENTOR.
LINZY W. BROOKS
BY
ATTORNEY 3,053,502
SEALING WASHER FOR FAUCETS AND OTHER VALVES
Linzy W. Brooks, Portland, Oreg., assignor of one-half to Eugene D. Farley, Portland, Oreg.
Filed May 2, 1960, Ser. No. 25,943
2 Claims. (Cl. 251—357)

This invention relates to a sealing washer for use in faucets, steam valves, and like valves employed for fluid flow control.

It is the general object of this invention to provide for use in fluid flow control an efficient sealing washer which may be installed easily in conventional water faucets without modifying their structure and which has a service life of long duration, since its construction is such that abrasion of the sealing surface of the washer by contact with the valve seat is almost completely eliminated.

In the drawings:

FIG. 1 is a fragmentary elevation, partly in section, of a conventional faucet valve stem;

FIG. 2 is a view in elevation of the herein described sealing washer;

FIG. 3 is a sectional view taken along line 3—3 of FIG. 2;

FIG. 4 is a side elevation, partly in section, of a bearing cap which may be used in conjunction with the washer of FIGS. 2 and 3; and FIG. 5 is a view similar to FIG. 1, illustrating the application of the washer of FIGS. 2–4 to the valve stem illustrated therein.

In essence, the sealing washer of my invention comprises a washer body dimensioned to seat in a recessed washer holder on a faucet valve stem, the body preferably being stepped to overlie the edges of the holder recess. A guiding projection extends downwardly from the washer body.

A central spindle extending upwardly from the washer body is dimensioned for freely rotatable reception in a threaded axial bore in the stem. It is substantially aligned with the guiding projection.

Frangible webs may be provided on the side wall of the spindle for frictionally engaging the threaded side walls of the stem bore, thereby facilitating mounting the washer in the holder. In addition, a centrally perforated bearing cap may be placed over the spindle against the stepped surface of the washer body. This armors the latter against wear.

In FIG. 1 is illustrated a conventional faucet washer stem and washer holder. It comprises the stem 10 having an enlarged threaded portion 12 and a terminal, recessed washer holder 14. The recess 16 in the holder communicates with a threaded axial bore 18.

It is conventional practice to seat a centrally perforated faucet washer, not illustrated, in recess 16 where it is held in place by a screw threaded into bore 18. In this construction, the washer turns with the valve stem and accordingly rubs against the valve seat, causing it to wear rapidly.

The presently described washer, indicated generally at 20, may be used to replace the conventional washer in the above installation. As seen in FIGS. 2 and 3, it comprises a washer body 22, preferably of the indicated stepped configuration, having a beveled outer sealing surface 24 designed to bear against the valve seat of the faucet.

The stepped configuration of the valve body enables extension of sealing surface 24 to the greatest possible diameter. This in turn makes a single washer useful as a replacement for conventional washers over a range of sizes.

Extending upwardly from the valve body, substantially normal to the plane thereof, is a central axle or spindle 26. The diameter and length of the axle is such that it is readily insertable in axial bore 18 of the valve stem and is freely rotatable therein.

Webs 28 extend radially from the side wall of axle 26. These are made of frangible or deformable material and engage the threads of bore 18 as the axle is inserted into it. Any suitable number of webs may be provided, two or three at spaced intervals about the periphery of the axle being preferred. The webs may be self-threading, so that as the axle is inserted with a twisting motion it is in effect threaded into the valve stem and temporarily retained there by the webs pending insertion into the faucet body.

To minimize wear of the stepped portion of the body, which seats within recess 16, there may be provided a flanged, centrally perforated bearing cap 30, shown in FIG. 4. The cap may be placed over axle 26 and about the stepped portion of the washer body in the manner indicated in FIG. 5. Wear caused by relative movement of washer 20 and washer holder 14 thus will be minimized.

Cap 30 may be made of brass or other wear resistant material not subject to corrosion. It is located on the washer body in part by means of a boss 32 on the latter which extends into the central perforation of the cap.

Means also are provided for assisting in seating the washer in the faucet or valve, and for maintaining it correctly in position, free from side slip, during use. Such means in their illustrated form comprise a guiding projection 34 extending downwardly from the central portion of the washer body substantially normal to the plane thereof and in substantially axial alignment with axle 26.

All of the elements of the washer, i.e. washer body 22, axle 26, web members 28, boss 32, sealing surface 24, and guiding projection 34, preferably are formed integrally of a suitable material such as molded plastic. A diversity of plastics may be used, those being preferred which are resistant to wear as well as to the action of hot liquids or vapors. "Tenite," for example, is a suitable plastic for my purpose.

When installing and using the sealing washer of my invention, the stem assembly is removed from the valve body and the conventional washer, if present, removed from washer holder 16. Flanged bearing cap 30 then is placed over axle 26 and the stepped inner surface of washer body 20 until it is seated securely thereover, with boss 32 extending into the central perforation of the cap.

Next axle or spindle 26 is inserted into threaded bore 18 of the valve stem with a twisting motion so that frangible webs 28 thread themselves onto the threads of the bore. The washer then assumes the position of FIG. 5, and is self supporting as it is placed in the valve body.

Upon reinserting the valve stem into the valve body with the usual rotary motion, sealing surface 24 of the washer is seated against the valve seat, effectively closing the passageway through the valve. As the valve stem is tightened down, frangible webs 28 break, or are deformed, so that the washer and the washer holder are freely rotatable relative to each other. As a consequence, in spite of the rotation of the washer holder, the washer does not turn as it is pressed firmly down against the valve seat. This eliminates abrasive action and insures long service life, which also is assured by the armoring effect of bearing cap 30 overlying the body of the washer and protecting it from wearing against the inner surface of recess 16.

The washer is prevented from becoming displaced during use, even though it is not physically attached to the washer holder, by the locating action of axle 26, and of guiding projection 34 which maintain it centrally located within the valve body.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A sealing washer adapted for use with faucet valves of the type including a recessed washer holder mounted on a valve stem and communicating with an axial bore in the stem, said washer comprising: a washer body dimensioned to seat in the holder and provided with an outer sealing surface, a central spindle on the washer body adapted to be received in the axial bore of the stem, and frangible webs on the spindle adapted for engaging frictionally the side walls of the stem bore for installation only, the webs releasing from the side walls of the stem bore during first use of the washer to provide free movement of the spindle in the axial bore of the stem.

2. A sealing washer assembly adapted for use with faucet valves of the type having a recessed washer holder mounted on a valve stem and communicating with an axial bore in the stem comprising: a longitudinally stepped washer body provided with an end sealing surface, an axial guide projection extending outwardly from the sealing surface, a central spindle projecting from the washer body in the direction opposite from the guide projection and dimensioned for free movement in the axial bore of the stem, and a centrally apertured bearing cap dimensioned for placement over the spindle, the bearing cap having a socket to receive a first stepped portion of the washer body and having a peripheral flange, the cap being adapted to seat in the recess of the washer holder for rotation therein with its flange seated on the radially projecting edges of the washer holder around the recesses, a second stepped portion of the washer being engageable with the flange portion of the cap.

References Cited in the file of this patent

UNITED STATES PATENTS

| | | |
|---|---|---|
| 1,211,595 | Kimmey | Jan. 9, 1917 |
| 2,081,616 | Diamond | May 25, 1937 |
| 2,121,315 | Black | June 21, 1938 |
| 2,247,099 | Rice | June 24, 1941 |
| 2,952,439 | Koons | Sept. 13, 1960 |

FOREIGN PATENTS

| | | |
|---|---|---|
| 588,831 | Great Britain | June 4, 1947 |